US011814543B2

(12) United States Patent
Weaver et al.

(10) Patent No.: US 11,814,543 B2
(45) **Date of Patent: *Nov. 14, 2023**

(54) CORROSION PROTECTION FOR METALLIC SUBSTRATES

(71) Applicant: APPLIED GRAPHENE MATERIALS UK LIMITED, Redcar (GB)

(72) Inventors: William Weaver, Redcar (GB); Matthew David Sharp, Redcar (GB); Gaven Johnson, Redcar (GB)

(73) Assignee: APPLIED GRAPHENE MATERIALS UK LIMITED, Redcar (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/967,709

(22) PCT Filed: Feb. 6, 2019

(86) PCT No.: PCT/GB2019/050316

§ 371 (c)(1),
(2) Date: Aug. 5, 2020

(87) PCT Pub. No.: WO2019/155201

PCT Pub. Date: Aug. 15, 2019

(65) Prior Publication Data

US 2021/0040331 A1 Feb. 11, 2021

(30) Foreign Application Priority Data

Feb. 6, 2018 (GB) ..................................... 1801931

(51) Int. Cl.

| | |
|---|---|
| ***C09D 5/08*** | (2006.01) |
| ***C08K 3/04*** | (2006.01) |
| ***B82Y 30/00*** | (2011.01) |
| ***C09D 7/61*** | (2018.01) |
| ***C09D 163/00*** | (2006.01) |
| ***C01B 32/158*** | (2017.01) |
| ***C01B 32/194*** | (2017.01) |
| ***C09D 7/40*** | (2018.01) |
| ***C09D 7/62*** | (2018.01) |
| ***B05D 7/14*** | (2006.01) |
| ***C09D 5/24*** | (2006.01) |
| ***C23C 28/04*** | (2006.01) |

(52) U.S. Cl.

CPC ............... *C09D 5/084* (2013.01); *B05D 7/14* (2013.01); *C01B 32/158* (2017.08); *C01B 32/194* (2017.08); *C08K 3/042* (2017.05); *C09D 5/24* (2013.01); *C09D 7/62* (2018.01); *C09D 7/66* (2018.01); *C09D 7/69* (2018.01); *C09D 7/70* (2018.01); *C09D 163/00* (2013.01); *C23C 28/04* (2013.01); *B05D 2202/25* (2013.01); *B82Y 30/00* (2013.01); *C01B 2204/04* (2013.01); *C01B 2204/22* (2013.01); *C01B 2204/32* (2013.01); *C01P 2004/24* (2013.01); *C01P 2004/64* (2013.01)

(58) Field of Classification Search

CPC ........ C08K 3/042; C08K 3/046; C09D 5/084; C09D 5/08; C09D 5/082; C09D 5/086; B05D 7/14

See application file for complete search history.

(56) References Cited

U.S. PATENT DOCUMENTS

2011/0256387 A1* 10/2011 Cho .................. C08G 18/3215 252/511
2011/0303121 A1 12/2011 Geim et al.
2012/0045692 A1* 2/2012 Takemura ........... H01M 4/1393 429/232
2013/0295374 A1* 11/2013 Tang ...................... C01B 32/05 252/502
2014/0155544 A1* 6/2014 Du .......................... C08K 3/04 524/575.5
2014/0158986 A1* 6/2014 Leung ............. H01L 31/035227 977/932
2014/0315083 A1* 10/2014 Liu ...................... H01M 4/366 429/223

(Continued)

FOREIGN PATENT DOCUMENTS

CN 105008466 A 10/2015
CN 106497338 3/2017

(Continued)

OTHER PUBLICATIONS

Lee, Preparation and Characterization of Poly(ethylene oxide)/Graphene Nanocomposites from an Aqueous Medium, 2010, Journal of Macromolecular Science, Part B: Physics, 49:802-809. (Year: 2010).*

Asmatulu, Synthesis and Analysis of Injection-Molded Nanocomposites of Recycled High-Density Polyethylene Incorporated with Graphene Nanoflakes, 2015, Polymer Composites, DOI 10.1002/pc, pp. 1565-1573. (Year: 2015).*

Awasthi, Synthesis of nano-carbon (nanotubes, nanofibers, graphene) materials, 2011, Bull. Mater. Sci., vol. 34, No. 4, pp. 607-614. (Year: 2011).*

Worsley, Toward Macroscale, Isotropic Carbons with Graphene-Sheet-Like Electrical and Mechanical Properties, 2014, Adv. Funct. Mater., WILEY-VCH Verlag GmbH & Co. KGaA, Weinheim, vol. 24, pp. 4259-4264. (Year: 2014).*

(Continued)

*Primary Examiner* — Monique R Jackson
(74) *Attorney, Agent, or Firm* — Lee & Hayes, P.C.

(57) ABSTRACT

A composition suitable for coating a metallic substrate that is susceptible to corrosion is disclosed. The composition comprises a carrier medium and graphene platelets in which the graphene platelets comprise between 0.002 wt % and 0.09 wt % of the coating, and the graphene platelets comprise one of or a mixture of two or more of graphene nanoplates, bilayer graphene nanoplates, few-layer graphene nanoplates, and/or graphite flakes in which the graphite flakes have one nanoscale dimension and 25 or less layers.

13 Claims, 5 Drawing Sheets

(56) References Cited

U.S. PATENT DOCUMENTS

| | | | | |
|---|---|---|---|---|
| 2015/0008123 A1* | 1/2015 | Cheng | B03C 5/02 204/600 |
| 2015/0240088 A1* | 8/2015 | Asay | C09D 7/70 252/511 |
| 2016/0024310 A1* | 1/2016 | McMullin | C09D 7/62 428/418 |
| 2016/0185983 A1* | 6/2016 | Lui | C09D 7/70 252/75 |
| 2017/0107333 A1* | 4/2017 | Hu | C09J 9/02 |
| 2017/0349763 A1 | 12/2017 | Wu et al. | |

FOREIGN PATENT DOCUMENTS

| | | | | |
|---|---|---|---|---|
| CN | 106497338 A | | 3/2017 | |
| CN | 106893447 A | | 6/2017 | |
| CN | 107163712 A | | 9/2017 | |
| CN | 107459906 A | | 12/2017 | |
| CN | 107474698 A | | 12/2017 | |
| CN | 106893447 | | 8/2019 | |
| GB | 2548394 A | | 9/2017 | |
| GB | 2556879 A | | 6/2018 | |
| GB | 2528306 A | | 5/2020 | |
| JP | 2011503320 A | | 9/2012 | |
| JP | 2016507404 A | | 7/2017 | |
| JP | 2017210515 A | | 11/2017 | |
| WO | WO-2018032055 A1 | * | 2/2018 | B32B 15/04 |
| WO | WO-2019028199 A1 | * | 2/2019 | B05D 1/007 |

OTHER PUBLICATIONS

Biswas, Mechanical and electrical property enhancement in exfoliated graphene nanoplatelet/liquid crystalline polymer nanocomposites, 2010, Composites: Part A 42, pp. 371-375. (Year: 2010).*

Ludbrook, Evidence of superconductivity in Li-decorated monolayer graphene, 2015, PNAS, vol. 112, No. 38, pp. 11795-11799, and supporting information, pp. 1-6. (Year: 2015).*

Chinese Office Action for Chinese application related to U.S. Appl. No. 16/967,709 dated Apr. 1, 2021 Weaver,William "Corrosion Protection for Metallic Substrates" 9 pages.

GB Search Report dated Jul. 25, 2018 for priority GB Application 1801931.5, 5 pages.

PCT International Search Report and Written Opinion dated May 20, 2019, for related application, PCT/GB2019/050316, 17 pages.

Pourhashem Sepideh, et al., "Excellent Corrosion Protection Performance of Epoxy Composite Coatings Filled with Amino-Silane Functionalized Graphene Oxide," Surface and Coatings Technology, vol. 317, Mar. 22, 2017 (Mar. 22, 2017), pp. 1-9, XP029975583, ISSN: 0257-8971, DOI: 10.1016/J.Surfcoat.2017.03.050 abstract paragraph [02.3] figures 5, 6, 9.

Swetha Chandrasekaran et al: "Thermally reduced graphene oxide acting as a trap for multiwall carbon nanotubes in bi-filler epoxy composites", Composites Part A: Applied Science and Manufacturing, vol. 49, Feb. 26, 2013 (Feb. 26, 2013), pp. 51-57, XP055586938, Amsterdam, NL ISSN: 1359-835X, DOI: 10.1016/i.compositesa.2013.02.008.

Yong Tae Park et al: "Epoxy Toughening with Low Graphene Loading", Advanced Functional Materials, vol. 25, No. 4, Jan. 1, 2015 (Jan. 1, 2015 ), pp. 575-585, XP055587 496, DE ISSN: 1616-301X, DOI: 10.1002/adfm.201402553.

GB Office Action dated Feb. 23, 2022 for priority GB Application 1801931.5, 5 pages.

Chinese Office Action for Chinese application related to U.S. Appl. No. 16/967,709 dated Nov. 30, 2021 Weaver,William "Corrosion Protection for Metallic Substrates" 12 pages.

Singapore Office Action for Singapore application related to U.S. Appl. No. 16/967,709 dated Jan. 12, 2022 Weaver,William "Corrosion Protection for Metallic Substrates" 6 pages.

Japanese Office Action dated Dec. 9, 2022, for JP application No. JP2020-563826, a counterpart foreign application of U.S. Appl. No. 16/967,709, 16 pages.

* cited by examiner

| | Conductivity (S/m @20°C) |
|---|---|
| Aluminium | $3.50x10^{7}$ |
| Magnesium | $2.15x10^{7}$ |
| Graphene Grade 1 | $1.00x10^{8}$ |
| Graphene Grade 2 | $2.00x10^{-5}$ |

FIG. 1

| Formulation: | Control A | Control B | 1 | 2 | 3 | 4 | 5 | 6 |
|---|---|---|---|---|---|---|---|---|
| Epoxy (wt%) | 100.000 | 0.000 | 99.9 | 99.97 | 99.997 | 99.5 | 99.97 | 99.997 |
| Graphene Grade 1 (wt%) | 0.000 | 0.000 | 0.1 | 0.03 | 0.003 | 0 | 0.000 | 0.000 |
| Graphene Grade 2 (wt%) | 0.000 | 0.000 | 0.000 | 0.000 | 0.000 | 0.5 | 0.03 | 0.003 |

FIG. 2

| Sample Data - Unscribed Samples | | | | | | | | |
|---|---|---|---|---|---|---|---|---|
| Formulation: | Control B | Control A | 1 | 2 | 3 | 4 | 5 | 6 |
| | | | | | | | | |
| Ecorr (mV) | -908 | -1090 | -797 | -1090 | -689 | -1030 | -958 | -1060 |
| Beta A (V/decade) | 0.4663 | 0.9543 | 0.2034 | 0.8662 | 0.0243 | 0.5680 | 0.3792 | 0.8343 |
| Beta C (V/decade) | 0.2084 | 0.1847 | 0.2254 | 0.5344 | 0.3138 | 0.4040 | 0.2085 | 0.3417 |
| Icorr (nA) | 10900.00 | 621.00 | 261.00 | 10.40 | 139.00 | 8.96 | 10.30 | 13.00 |
| Corrosion Rate (mil per year) | 0.3200 | 0.0188 | 0.0077 | 0.0003 | 0.0041 | 0.0003 | 0.0003 | 0.0004 |
| Corrosion Rate (μ per year) | 8.0000 | 0.4695 | 0.1918 | 0.0077 | 0.1022 | 0.0066 | 0.0076 | 0.0095 |

| Sample Data - Scribed Samples | | | | | | | | |
|---|---|---|---|---|---|---|---|---|
| Formulation: | Control B | Control A | 1 | 2 | 3 | 4 | 5 | 6 |
| | | | | | | | | |
| Ecorr (mV) | -908 | -797 | -1010 | -698 | -806 | -958 | -964 | -838 |
| Beta A (V/decade) | 0.4385 | 0.1976 | 0.9174 | 0.0435 | 0.2558 | 0.3759 | 0.3720 | 0.2155 |
| Beta C (V/decade) | 0.2027 | 0.2221 | 0.1441 | 0.3826 | 0.2115 | 0.2096 | 0.2019 | 0.0961 |
| Icorr (nA) | 10400.00 | 255.00 | 687.00 | 173.00 | 8.52 | 10.20 | 10.20 | 159.00 |
| Corrosion Rate (mil per year) | 0.306200 | 0.007497 | 0.002020 | 0.005092 | 0.000251 | 0.000301 | 0.000301 | 0.004667 |
| Corrosion Rate (μ per year) | 7.655000 | 0.187425 | 0.050500 | 0.127300 | 0.006265 | 0.007523 | 0.007515 | 0.116675 |

FIG. 3

| Formulation | Control C | 7 | 8 | 9 | 10 | 11 |
|---|---|---|---|---|---|---|
| Epoxy (wt%) | 100 | 99.9 | 99.75 | 99.5 | 99 | 95 |
| Graphene Grade 2 (wt%) | 0 | 0.1 | 0.25 | 0.5 | 1 | 5 |

CORROSION PROTECTION FOR METALLIC SUBSTRATES

CROSS REFERENCE TO RELATED APPLICATIONS

This application is a US national stage entry of International Patent Application No. PCT/GB2019/050316, filed Feb. 6, 2019, which claims priority to GB1801931.5, filed Feb. 6, 2018, the entire contents of each of which are incorporated by reference herein.

BACKGROUND OF THE DISCLOSURE

This invention relates to corrosion protection for metallic substrates. In particular, this application relates to corrosion protection for metallic substrates such as but not limited to aluminium and aluminium alloys.

Some known compositions for use in offering corrosion protection to metallic substrates are generally known as inhibitive coatings and compositions. Such coatings and compositions are primarily applied as primers because they function by reaction of constituents/pigments of the coating with a metallic substrate. The inhibitive mechanism relies on passivation of the metal and the build-up of a layer of oxides as well as metallic complexes on the surface of the metallic substrate. The oxides and metallic complexes impede the transport of aggressive species to the metal of the substrate.

The active constituents/pigments of inhibitive coatings are typically marginally water soluble and produce active species which inhibit the ongoing corrosion of the metallic substrate. The active constituents/pigments currently used are commonly chromates but other species such as phosphates, molybdates, nitrates, borates and silicates are also used. The selection of active constituents/pigments is increasingly subject to regulatory pressures due to increased concerns for the environment and health and safety.

Current regulations in the European Union restrict the materials which can be used in inhibitory coatings. Chrome (VI) compounds have been subject to authorisation under REACH (2008 Annex XIV). Other legislative measures relating to anticorrosive pigments include the ELV (End of Life vehicle) directive which has seen the phase out of lead pigments from 2003 and Cr (VI) in primers and pretreatments from 2007.

Other regulations include WEEE (Waste Electrical and Electronic Equipment Directive 2006) and RoHS (Restriction of Hazardous Substances Directive 2002) directives which restricted use of Cr (VI) in white goods. In the US OSHA (Occupational Safety and health Administration regulation 2006) reduced employee permissible exposure to Cr (VI) 52 $\mu g/m^3$ to 5 $\mu g/m^3$. Zinc phosphate is also becoming of increasing concern given that it is toxic to aquatic organisms and may cause long-term adverse effects in the aquatic environment. Accidental ingestion of the active constituents/pigments may be damaging to the health of the individual. Soluble zinc salts produce irritation and corrosion of the alimentary tract with pain, and vomiting.

The mechanism of inhibitive pigments is based on the partial dissolution of the pigment by water diffused into the coating. At the surface of the substrate the dissolved ions react and form a reaction product that passivates the surface. It is critical that the active constituents/pigments are sufficiently highly soluble to release ions for reaction. Too high a solubility can, however, result in blistering of the coating. An ideal inhibitive coating should form a barrier against water and detrimental ions while simultaneously releasing sufficient quantity of inhibitor ions. These two requirements are antagonistic in principle and the inhibitive coating requires a balance between the barrier properties of the coating (the lower the permeability the better the barrier properties) and in the ability of pigment to solvate and the ions created to transfer to the coating substrate interface (the higher the permeability the greater the solvation and transfer of ions).

Other known compositions for use in offering corrosion protection to metallic substrates comprise a carrier medium and graphene platelets at a quantity of at least 0.1 wt %. The graphene platelets may be dispersed directly into the carrier medium, for example a typical coating resin system including, but not limited to: crosslinkable resins, non-crosslinkable resins, thermosetting acrylics, aminoplasts, urethanes, carbamates, polyesters, epoxies, silicones, polyureas, silicates, polydimethyl siloxanes using methods such as triple roll mills. Alternatively, the graphene may be introduced via a solvent dispersion in which support resins and dispersants may be used to deliver optimum dispersion and stabilisation. Such solvent dispersions may be made using combination of ultrasonics and beadmill processing. The incorporation of graphene into a resin enables the delivery of graphene in a traditional coating format and as such deliverable by any of the traditional methods available (brush, roller, airspray, airless, electrostatic spray, rotary atomising, dip coating, flow coating, curtain coating, and electrocoating). The graphene will, depending on concentration of incorporation and applied dry film thickness, result in multiple layers of graphene platelets in the coating. The presence of multiple layers of graphene platelets provides a complex and tortuous path for the penetration of water and the dissolved oxygen or ions it carries through the coating.

BRIEF DESCRIPTION OF THE DRAWINGS

The detailed description is described with reference to the accompanying drawings.

FIG. 1 is a table illustrating example collected data.

FIG. 2 is a table illustrating example collected data.

FIG. 3 is a table illustrating example collected data.

Figure 4:
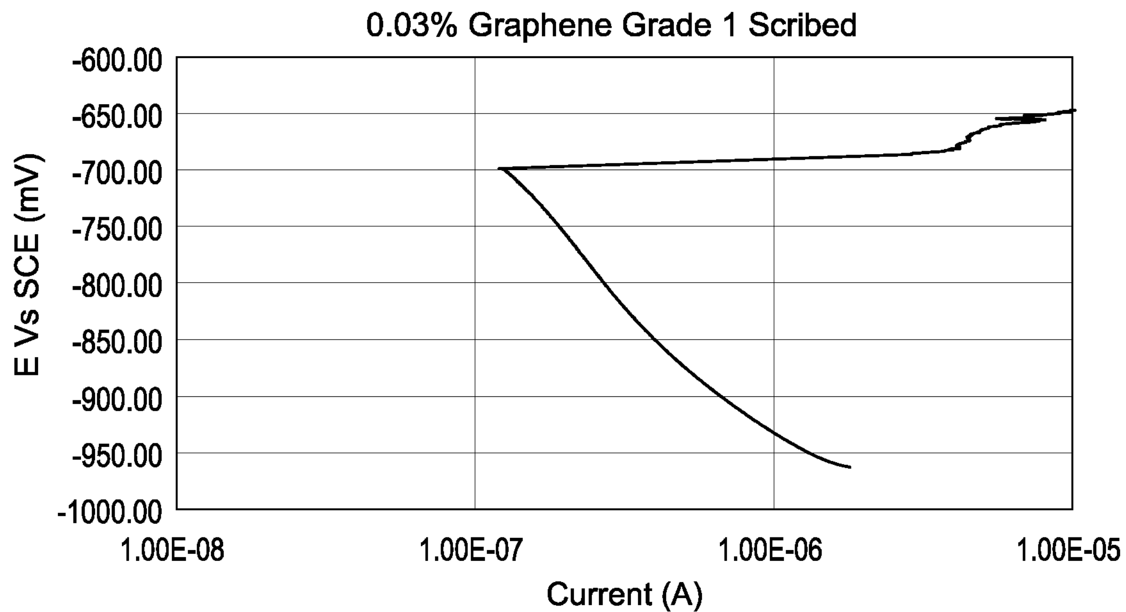
FIG. 4 is a graph illustrating example collected data.

According to a first aspect of the present invention there is provided a composition suitable for coating a metallic substrate that is susceptible to corrosion characterised in that the composition comprises a carrier medium and graphene platelets in which the graphene platelets comprise between 0.002 wt % and 0.09 wt % of the coating, and the graphene platelets comprise one of or a mixture of two or more of graphene nanoplates, bilayer graphene nanoplates, few-layer graphene nanoplates, and/or graphite flakes in which the graphite flakes have one nanoscale dimension and 25 or less layers.

Graphite flakes with one nanoscale dimension are comprised of at least 10 layers of carbon atoms. Preferred graphite flakes are graphite flakes with one nanoscale dimension and 10 to 20 layers of carbon atoms, graphite flakes with one nanoscale dimension and 10 to 14 layers of carbon atoms, graphite flakes with one nanoscale dimension and 25 or less layers of carbon atoms, graphite flakes with one nanoscale dimension and 20 to 25 layers of carbon atoms. It is preferred that the graphite flakes have lateral dimensions ranging from around 100 nm to 100 μm.

In some embodiments of the present invention at least 50 wt % of the graphene platelets graphite flakes with one nanoscale dimension and 25 or less layers.

In some embodiments of the present invention the graphene platelets comprise between 0.002 wt % and 0.004 wt % of the coating, between 0.003 wt % and 0.004 wt % of the coating between 0.0026 wt % and 0.04 wt % of the coating, between 0.0026 wt % and 0.0035 wt % of the coating, between 0.006 wt % and 0.009 wt % of the coating, around 0.003 wt % of the coating, or around 0.03 wt % of the coating.

A coating using such compositions has been found to have a packing density of the graphene platelets which is sufficiently low that the graphene platelets are fully encapsulated within the carrier medium and the majority of the graphene platelets are not in physical and/or electrical contact with any other graphene platelets.

This full encapsulation of the graphene and the lack of contact between the graphene platelets has surprisingly been found to have considerable benefits. In particular, because none of the graphene platelets are in contact with each other or the metallic substrate on which the coating is applied they cannot cause the formation of any galvanic cells on the surface of the substrate.

An uncoated/protected metal substrate will oxidize/corrode at a rate dependent on the environmental conditions in which the substrate is located. If the environmental conditions include moisture then the oxidation tends to be more rapid than when the environmental conditions are dry.

It has been found that when a coating using a composition according to the first aspect of the present invention is damaged sufficiently for the metallic substrate to be exposed, some of the graphene platelets are driven into contact with the metallic substrate in the area of the damage and/or some graphene platelets are exposed to the atmosphere in the damaged faces of the coating. The exposed graphene platelets will then, especially in the presence of moisture, catalyse the oxidation of the metallic substrate.

When the metallic substrate is aluminium or an alloy of aluminium, electrochemical oxidation may occur.

This is predominantly an electrochemically-driven redox process where the oxidation half reaction at the anodic sites proceeds as follows:

$$Al \rightarrow Al^{3+} + 3e^-$$

The complimentary reduction process which occurs at the cathodic sites on the metal surface proceeds as follows:

$$O_2 + 2H_2O + 4e^- \rightarrow 4OH^-$$

By their very nature, the above oxidation and reduction reactions are coupled by electron transfer, and the reaction of their ionic products as follows:

$$Al^{3+} + 3OH^- \rightarrow Al(OH)_3$$

Overall, the electrochemical oxidation of aluminium is as follows:

$$4Al + 6H_2O + 3O_2 \rightarrow 4Al(OH)_3$$

The aluminium hydroxide may then be transformed into alumina by hydration:

$$Al(OH)_3 \rightarrow Al_2O_3 \cdot 3H_2O$$

The alumina ($Al_2O_3 \cdot 3H_2O$) layer is normally 5-10 nanometres thick and is formed as soon as the metal comes into contact with an oxidising environment. The alumina has a dual nature and consists of a compact and stable inner oxide layer covered with a porous, less stable outer layer which is more susceptible to corrosion/dissolution with the result that the corrosion resistance of the aluminium substrate is dependent on the stability of the oxide layer. The alumina layer is of a much lower electrical conductivity than the aluminium.

It has been found that the catalysation of the aluminium oxidation both increases the rate of oxidation of the aluminium to alumina and causes that oxidation to continue until a thick layer of alumina has built up and sealed the aluminium substrate and the exposed graphene platelets from the atmosphere. As a result, the presence of the graphene in the composition according to the first aspect of the present invention at the quantities discussed above causes the coating formed from that composition to be self-healing because the alumina formed heals the damage to the coating.

The self-healing nature of the coating has an additional benefit in that because any damage to the coating is rapidly closed by the alumina, the chances of water entering the interface between the aluminium substrate and the coating and subsequently propagating out from the area of damage and causing delamination of the coating are substantially reduced.

Further benefits of the composition according to the first aspect of the present invention are as follows:

The graphene platelets used in the present invention do not have the proven environmental detriments that are known to exist for phosphates, chromates, molybdates, nitrates, borates or silicates.

The graphene platelets used in the present invention are a relatively new technology and it is not yet known whether they may themselves have any environmental detriment. If they are found to give rise to environmental detriments then the levels of graphene platelets in the composition are so low that those environmental detriments will be minimised.

The graphene platelets used in the present invention are generally of lower density than phosphates, chromates, molybdates, nitrates, borates or silicates leading to lighter coatings. This is particularly so at the graphene platelet loading of the present invention.

In some embodiments of the present invention more than 50%, 60%, 70%, 80% 90% or 95% of the graphene platelets have an electrical conductivity greater than around $2.15\times10^7$ S/m at 20° C. or around $3.5\times10^7$ S/m at 20° C. Such high levels of conductivity assist in the catalysation of the oxidation of the exposed metal substrate.

In some embodiments of the present invention the graphene platelets have a particle size distribution in which D50 is equal to or less than 50 μm, equal to or less than 30 μm, equal to or less than 20 μm, or equal to or less than 15 μm. The processing of the graphene platelets may be carried out by a triple roll mill, with gap sizes of 15/5 microns at 3 passes, bead milling, ultrasonication, ultra high speed dispersion or other appropriate known techniques. Particle size may be measured on a Malver Mastersizer 3000 by dilution of the carrier resin in a suitable solvent after which the D50 particle sizes are measured.

In some embodiments of the present invention the carrier medium is an electrical insulator.

In some embodiments of the present invention the carrier medium is selected from known crosslinkable resins, non-crosslinkable resins, thermosetting acrylics, aminoplasts, urethanes, carbamates, polyesters, epoxies, silicones, polyureas, silicates, polydimethyl siloxanes, and mixtures and combinations thereof. The selection of the appropriate carrier medium will be dependent on the intended circumstances of use for the composition according to the first aspect of the present invention.

In some embodiments of the present invention the carrier medium is plastically deformable once it has set/cured. The characteristic of the carrier medium being plastically deformable once it has set/cured has the result that it has sufficient flexibility not to expose large areas of substrate when damaged. Such a characteristic of the carrier medium will have the effect that damage to the coating using a composition including such a carrier medium will be relatively localised to the cause of the damage and it is unlikely that the damage will propagate away from the location or cause of the damage.

In some embodiments the strength of adhesion of the carrier medium to the metallic substrate is such that an impact or pressure of sufficient force that the coating is damaged but that the metallic substrate is not deformed does not cause the coating to separate from the metallic substrate.

In some embodiments of the present invention the composition further comprises a solvent and or a dispersant. These will affect the handling and or application properties of the composition and the ease of formulation of the composition respectively.

According to a second aspect of the present invention there is provided a coating system for a metallic substrate that is susceptible to corrosion in which the system comprises the creation of a first coating on the metallic substrate, and, subsequently, a second coating over the first coating characterised in that the first coating is formed from a composition according to the first aspect of the present invention, and the second coating is formed from a second composition which comprises a carrier medium and 2D material/graphitic platelets in which the 2D material/graphitic platelets comprise more than 0.1 wt % of the second coating.

In some embodiments of the second aspect of the present invention, the 2D material/graphitic platelets of the second composition comprise graphene platelets. In some embodiments the graphene platelets of the second composition comprise one of or a mixture of two or more of graphene, graphene oxide, and/or reduced graphene oxide nanoplates, bilayer graphene, graphene oxide, and/or reduced graphene oxide nanoplatelets, few-layer graphene, graphene oxide, and/or reduced graphene oxide nanoplatelets, and/or graphite flakes in which the graphite flakes have one nanoscale dimension and 25 or less layers.

In some embodiments of the second aspect of the present invention, the 2D material/graphitic platelets of the second composition comprises one or a mixture of graphene (C), graphene oxide, reduced graphene oxide, hexagonal boron nitride (hBN), molybdenum disulphide ($MoS_2$), tungsten diselenide ($WSe_2$), silicene (Si), germanene (Ge), Graphyne (C), borophene (B), phosphorene (P), or a 2D in-plane heterostructure of two or more of the aforesaid materials.

Layered 2D materials may be layers of graphene (C), graphene oxide, reduced graphene oxide, hexagonal boron nitride (hBN), molybdenum disulphide ($MoS_2$), tungsten diselenide ($WSe_2$), silicene (Si), germanene (Ge), Graphyne (C), borophene (B), phosphorene (P), or a 2D vertical heterostructure of two or more of the aforesaid materials.

The coating system of the second aspect of the present invention has the benefit that the first and second coats can have different properties and, as a result, offer superior protection to the metallic substrate than either coating alone.

In some embodiments of the second aspect of the present invention the graphene platelets of the second coating comprise between 0.1 wt % and 20 wt % of the coating, between 0.1 wt % and 6.0 wt % of the coating, or between 0.1 wt % and 0.5 wt % of the coating. Such a coating will, as a result, depending on the concentration of incorporation of the graphene platelets and the applied dry film thickness, result in multiple layers of graphene platelets in the coating. The presence of multiple layers of graphene platelets provides a complex and tortuous path for the penetration of water (and any dissolved oxygen or ions it carries) through the coating. That path is expected to be significantly longer than the actual thickness of the second coating.

In some embodiments of the second aspect of the present invention more than 50%, 60%, 70%, 80% 90% or 95% of the graphene platelets of the second coating have an electrical conductivity which is less than the electrical conductivity of more than 50%, 60%, 70%, 80% 90% or 95% of the graphene platelets of the first coating.

In some embodiments of the second aspect of the present invention more than 50%, 60%, 70%, 80% 90% or 95% of the graphene platelets of the second coating have an electrical conductivity of around or less than $2.0\times10^{-5}$ S/m at 20° C.

According to a third aspect of the present invention there is provided a method of treatment of a metallic substrate in which the substrate is coated with a composition according to the first aspect of the present invention. The coating of the metallic substrate may be by brushing, spraying, dipping or other appropriate application techniques.

In some embodiments of the third aspect of the present invention the metallic substrate is aluminium, an aluminium alloy, or a magnesium based alloy.

According to a fourth aspect of the present invention there is provided a method of treatment of a metallic substrate in which the substrate is treated with the system according to the second aspect of the present invention. The coating of the metallic substrate and, subsequently, the first coating may be by brushing, spraying, dipping or other appropriate application techniques.

In some embodiments of the fourth aspect of the present invention the metallic substrate is aluminium, an aluminium alloy, or a magnesium based alloy.

Further advantages, properties, aspects and features of the present invention will become apparent from the following description of exemplary embodiments:

EXPERIMENTAL RESULTS

Various loadings of graphene nanoplatelets of varying conductivity as shown in FIG. 1 were incorporated into an epoxy system in the quantities shown in FIG. 2. The epoxy system used was an epoxy resin with and epoxy equivalent weight of 171-175 g/eq and the Grade 1 and Grade 2 graphene platelets had a particle size with a D50 of less than 50 μm. Control A is the epoxy system with no graphene included, and Control B is no formulation at all. That is Control B is bare, untreated metal.

The epoxy system and graphene platelets were weighed out using a 4 decimal place analytical balance.

Each of Formulations 1 to 6, Control A and Control B were applied to two aluminium panels. The aluminium panels were each made of aluminium 5005 alloy, an alloy with the following composition Magnesium (Mg) 0.50-1.10 wt %, Iron (Fe) 0.0-0.70 wt %, Silicon (Si) 0.0-0.30 wt %, Zinc (Zn) 0.0-0.25 wt %, Manganese (Mn) 0.0-0.20 wt %, Copper (Cu) 0.0-0.20 wt %, Others (Total) 0.0-0.15 wt %, Chromium (Cr) 0.0-0.10 wt %, Other (Each) 0.0-0.05 wt %, Aluminium (Al) Balance. Each Formulation and Control was applied by spray application, using a conventional gravity-fed gun, through a 1.2 mm tip, resulting in dry film thicknesses ranging from 40-60 μm on the aluminium panels. The panels were cured for 1 week at ambient temperature, before commencing testing.

One panel for each Formulation and Control was scribed with a 225 mm scribe using a knife. Care was taken that the scribes were as consistent as possible throughout due to relatively small surface area of study. The panels for each Formulation and Control were tested in duplicate in both scribed and unscribed forms. Scribed samples were studied because they offer an immediate study of a bare metal surface which may be contacted with an electrolyte without having to observe the lengthy breakdown/degradation of the film coating e.g. due to water uptake.

All electrochemical measurements were recorded using a Gamry 1000E potentionstat in conjunction with a Gamry ECM8 multiplexer to permit the concurrent testing of up to 8 samples per experiment. Each individual channel was connected to a Gamry PCT-1 paint test cell, specially designed for the electrochemical testing of coated samples.

Within each paint test cell, a conventional three-electrode system was formed, the bare aluminium, epoxy coated aluminium, and scribed coated epoxy aluminium panels were the working electrode, a graphite rod served as a counter electrode and a saturated calomel electrode (SCE) served as the reference electrode. All tests were run using a 3.5 wt % NaCl electrolyte.

For all samples, electrochemical testing consisted of corrosion potential measurements ($E_{corr}$) followed by potentiodynamic polarisation scans. Since this work is focused on the change in electrochemical properties over time, each cycle of experiments was conducted at approximate intervals of 2 hours over a period of 1 week for all samples.

Potentiodynamic polarisation scans were carried out in order to generate Tafel polarisation curves. These curves were produced as a result of applying a potential of ±250 mV from the open circuit potential (500 mV sweep) at a scan rate of 0.5 mV/second with a sample period of 1 second, over a sample area (working electrode area) of 14.6 $cm^2$. Data fitting to the Tafel region was carried out using the Gamry Echem Analyst software in order to extract values for the anodic and cathodic Tafel constants, $E_{corr}$, and corrosion rate. These values were then plotted for the time duration of the experiment.

All corrosion potential ($E_{corr}$) measurements were recorded against the SCE reference electrode.

Potentiodynamic polarisation scans permit considerable amounts of information on electrode processes to be determined. Through this technique, information on corrosion rate, pitting susceptibility, passivity and anode/cathode behaviour of an electrochemical system may be obtained. During such scans, the driving force of the anodic/cathodic reactions (potential) is varied and the net change in reaction rate (the current) is measured. Tafel plots are usually displayed with the applied potential on the y axis and the logarithm of the measured current on the x axis, where the top half above the corrosion potential represents the anodic portion of the plot and the bottom half below the corrosion potential represents the cathodic portion of the plot. The Tafel region or active region is usually a straight line and represents electron transfer i.e. the metal oxidation reaction for the anode and the oxygen reduction process in the case of the cathode. The intersection point of back extrapolation of the anodic and cathodic Tafel slopes represents the corrosion current, from which a corrosion rate may be determined. The gradient of the Tafel slopes themselves is equivalent to the Anodic/Cathodic Tafel constants, measured in volts/decade, and these values are a measure of the degree of increase in the overpotential required to increase the reaction rate (the current) by a factor ten.

Beyond the Tafel regions, when an extended potential range is applied, additional useful features may be observed in the polarisation data. In the case of the anode, one such feature is known as the passivation potential. As the applied potential increases above this value, a decrease in the measured current density is observed until a low, passive current density is achieved; the point at which the current density undergoes no change with an increase in applied potential (passive region). Beyond this point, if the applied potential permits and is sufficiently positive, the current rapidly increases: the breakaway potential. For aluminium alloys, this breakaway potential may be due to a localised breakdown in passivity (pitting).

EXAMPLE DATA

The data in FIG. 3 demonstrates the electrochemical values obtained for samples which have scribe damage, and intact coatings. It shows the corrosion potential ($E_{corr}$) The anodic and cathodic currents, and corrosion rate in μm per year and mils per year. This data is used to construct Tafel plots which in themselves demonstrate whether the corrosion mechanism is by barrier, or passivation.

The Tafel plot showing passivation occurring with Formulation 2 when scribed is shown in FIG. 4.

Figure 5:
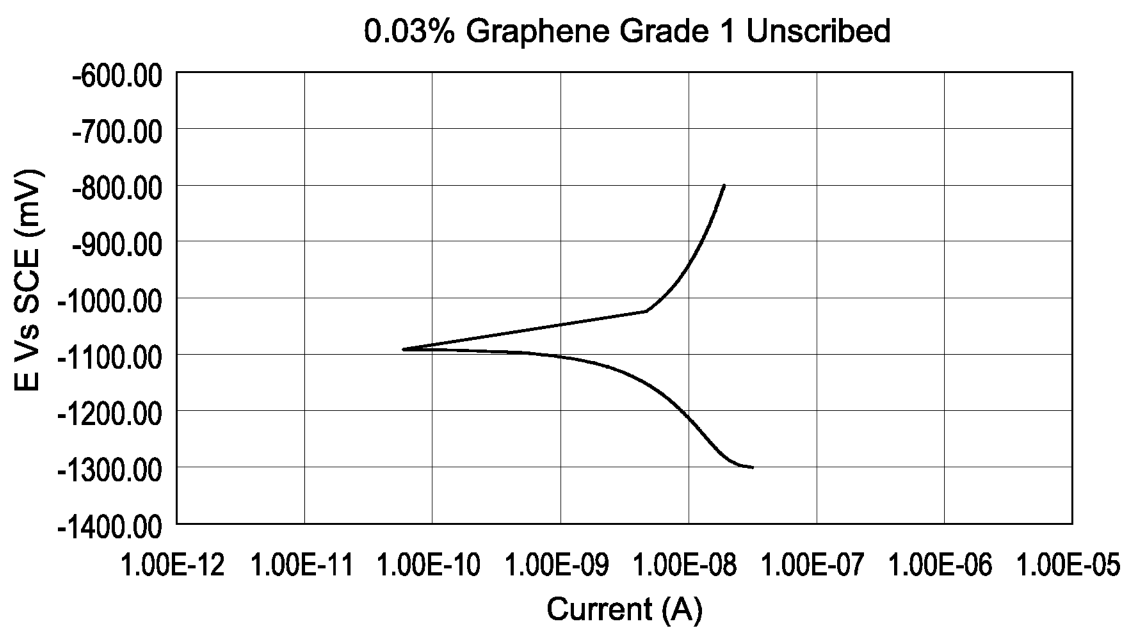
FIG. 5 is a graph illustrating example collected data.

The near flat gradient of the upper curve in FIG. 4 is consistent with passivation occurring at the substrate in this case an aluminium alloy. When no scribe is present, the coating itself acts as a barrier, and no passivation occurs as water and oxygen are not present at the substrate. The Tafel plot showing passivation occurring with Formulation 2 when unscribed is shown in FIG. 5.

Figure 6:
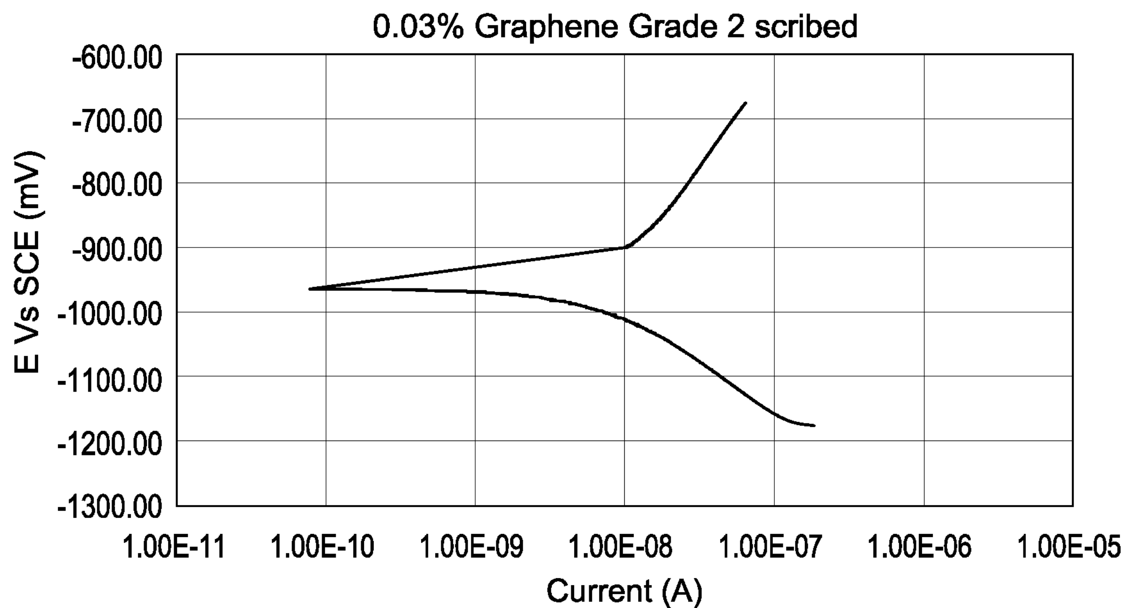
FIG. 6 is a graph illustrating example collected data.
Figure 7:
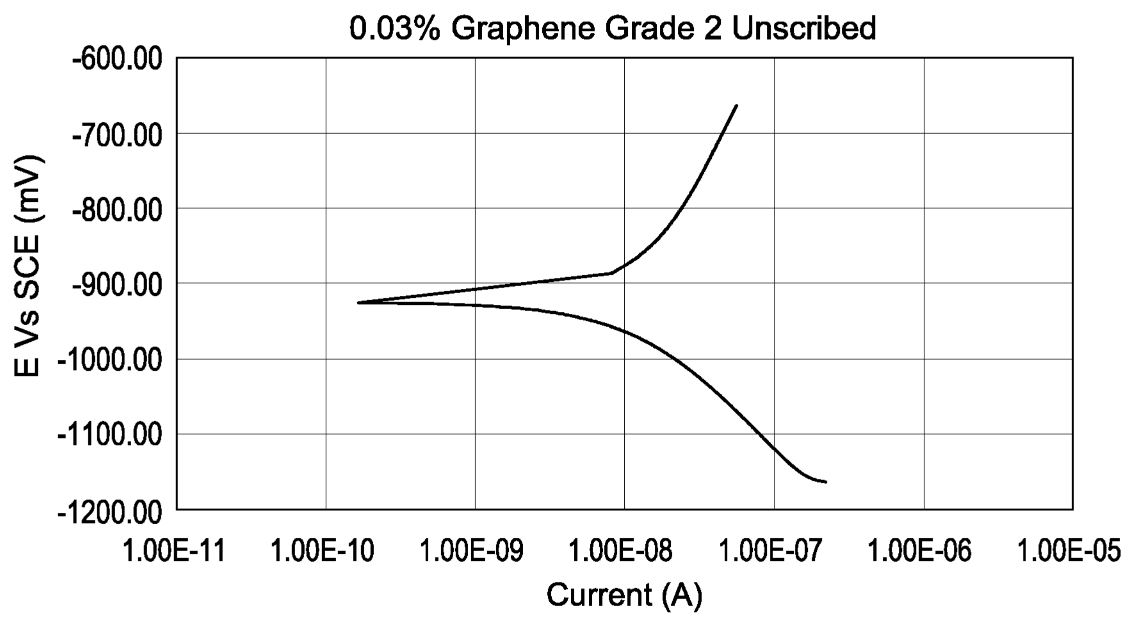
FIG. 7 is a graph illustrating example collected data.

In contrast an indication of barrier performance can be seen from Formulation 5. The Tafel plot occurring with Formulation 5 when scribed and un scribed are shown in FIGS. 6 and 7 respectively. There is little difference in the anodic and cathodic currents shown which is an indication that Graphene Grade 2 performs as a physical barrier, rather than controlling corrosion by passivation.

Barrier performance of the Graphene Grade 2 is also demonstrated with water vapour transmission testing. With five Formulations and a Control C as per FIG. 8. The epoxy was cured with a polyamide blend (epoxy:polyamide 5.36:1), and the panels were allowed to cure for a period of at least 7 days at a consistent ambient temperature.

Figures 8, 9:
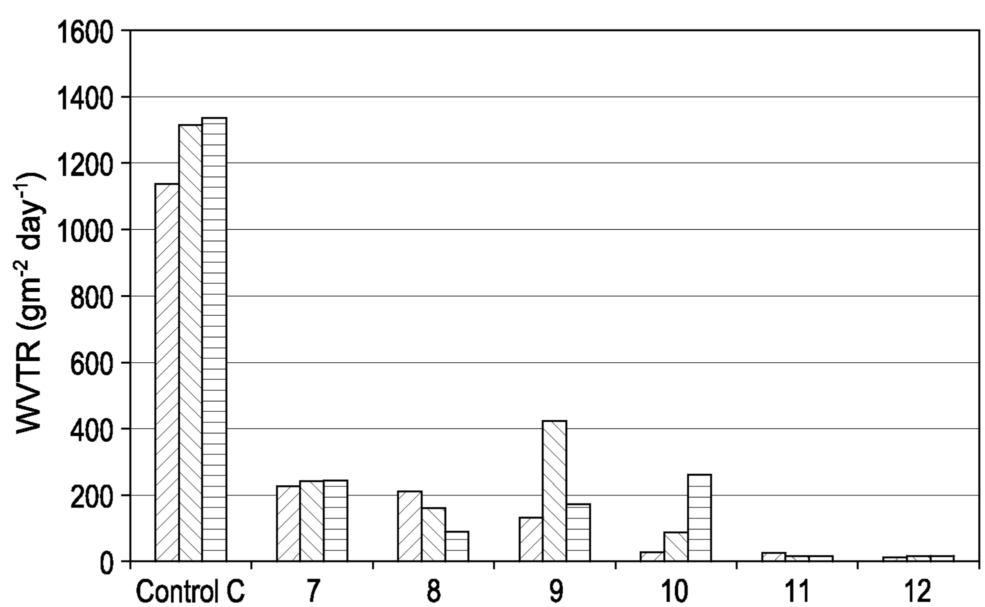
FIG. 8 is a table illustrating example collected data.
FIG. 9 is a graph illustrating example collected data.

Testing for the transmission of water through the film showed the results in FIG. 9. As may be seen, the data in FIG. 9 demonstrates a significant decrease in the transmission of water through the film as the loading of the Graphene Grade 2 increases.

The invention claimed is:

1. A coating system for coating a metallic substrate that is susceptible to corrosion, the coating system being for creation of a first coating on the metallic substrate, and, subsequently, a second coating over the first coating, the coating system comprising a first composition and a second composition, wherein the first coating is formed from the first composition and the second coating is formed from the second composition; the first composition is suitable for applying the first coating to the metallic substrate, and is characterised in that the first composition comprises a carrier medium and graphene platelets, in which the first coating comprises between 0.002 wt % and 0.009 wt % of the graphene platelets, and the graphene platelets comprise one of or a mixture of graphene nanoplates and/or graphite flakes in which the graphite flakes have one nanoscale dimension and 25 or less layers, wherein more than 50% of the graphene platelets have an electrical conductivity greater than $2.15\times10^{7}$ S/m at 20° C., and the carrier medium is an electrical insulator; and the second composition comprises a carrier medium and graphitic platelets in which the second coating comprises more than 0.1 wt % of the graphitic platelets, and in which more than 50% of the graphitic platelets of the second coating have an electrical conductivity of less than $2.0\times10^{-5}$ S/m at 20° C.

2. The coating system according to claim 1 in which the first coating comprises between 0.002 wt % and 0.004 wt % of the graphene platelets.

3. The coating system according to claim 1 in which a packing density of the graphene platelets in the first coating is sufficiently low that a majority of the graphene platelets are not in physical contact with any other graphene platelets.

4. The coating system according to claim 1 in which a packing density of the graphene platelets in the first coating is sufficiently low that a majority of the graphene platelets are not in electrical contact with any other graphene platelets.

5. The coating system according to claim 1 in which the graphene platelets of the first composition have a particle size distribution with a D50 of less than 30 μm.

6. The coating system according to claim 1 in which the graphene nanoplates of the first composition include bilayer graphene nanoplates and/or few-layer graphene nanoplates.

7. The coating system according to claim 1 in which more than 50% of the graphene platelets of the first composition have an electrical conductivity greater than $3.5\times10^{7}$ S/m at 20° C.

8. The coating system according to claim 1 in which at least 50 wt % of the graphene platelets of the first composition comprise graphite flakes with one nanoscale dimension and 25 or less layers.

9. The coating system according to claim 1 in which the first composition further comprises a solvent.

10. The coating system according to claim 1 in which the first composition further comprises a dispersant.

11. The coating system according to claim 1 in which the second coating comprises between 0.1 wt % and 20 wt % of the graphitic platelets.

12. A method of treatment of the metallic substrate, the method comprising coating the coating system according to claim 1 on the metallic substrate.

13. The method of treatment according to claim 12 in which the metallic substrate is aluminium, an aluminium alloy, or a magnesium alloy.

* * * * *